(12) United States Patent
Matsui et al.

(10) Patent No.: US 7,141,515 B2
(45) Date of Patent: Nov. 28, 2006

(54) METHOD FOR MANUFACTURING DEVICE

(75) Inventors: Jun Matsui, Kawasaki (JP); Hidehiko Nakata, Isehara (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 11/017,752

(22) Filed: Dec. 22, 2004

(65) Prior Publication Data

US 2005/0124173 A1 Jun. 9, 2005

Related U.S. Application Data

(63) Continuation of application No. PCT/JP02/09266, filed on Sep. 11, 2002.

(51) Int. Cl.
*H01L 21/31* (2006.01)
(52) U.S. Cl. .................. 438/780; 438/778; 257/E21.24
(58) Field of Classification Search ...................... None
See application file for complete search history.

(56) References Cited

U.S. PATENT DOCUMENTS 5,627,010 A * 5/1997 Pai et al. .................. 430/270.1
6,395,446 B1 * 5/2002 Seki et al. .................. 430/170

FOREIGN PATENT DOCUMENTS

| JP | 5-127030 | 5/1993 |
| JP | 6-347628 | 12/1994 |
| JP | 6-348017 | 12/1994 |
| JP | 7-33855 | 2/1995 |
| JP | 10-142438 | 5/1998 |
| JP | 2002-30420 | 1/2002 |
| JP | 2004-535829 | 3/2005 |
| WO | WO 03/012081 | 2/2003 |

OTHER PUBLICATIONS

Wolf et al. Silicon Processing for the VLSI Era, vol. 1, Lattice Press Sunset Beach, CA, 1986, pp. 407-409.*

* cited by examiner

*Primary Examiner*—Michael Lebentritt
*Assistant Examiner*—Cheung Lee
(74) *Attorney, Agent, or Firm*—Staas & Halsey LLP

(57) ABSTRACT

A method for manufacturing a device where an improvement of etching accuracy and curtailing of manufacturing costs are realized when a device is manufactured attended with etching, such as RIE, in which a device; i.e., an object of etching, evolves heat.

The method includes a coating step of applying over the surface of a device a photosensitive resin containing a phenol-based resin as a main ingredient; a transfer step of transferring a desired pattern on a device surface coated with the photosensitive resin by means of exposing the device surface coated with the photosensitive resin to light with the desired pattern; a development step of subjecting to development treatment the device having the pattern transferred thereon; and an etching step of etching the device surface while the pattern of the photosensitive resin developed through the development treatment is taken as a mask pattern.

9 Claims, 5 Drawing Sheets

METHOD FOR MANUFACTURING DEVICE

This application is a continuation application, filed under 35 USC 111(a), of International Application PCT/JP2002/009266, filed Sep. 11, 2002.

FIELD OF THE INVENTION

The present invention relates to a method for manufacturing a device; for example, a device manufacturing method for use in manufacturing a planer lightwave circuit device indispensable for an optical transmission device used in the field of optical communication.

BACKGROUND

In association with an increase in communication traffic, construction of a large-capacity optical network using wavelength division multiplexing (WDM) is being pursued. Application of a planer lightwave circuit (PLC) which can be mass-manufactured is promising for miniaturization and cost-reduction of a WDM optical transmission system.

FIGS. 4(a) to 4(e) are views showing processes for manufacturing a quartz-based planer lightwave circuit device 100 which is taken as a conventionally-used PLC-type integrated element. When the planer lightwave device 100 is manufactured through the processes shown in FIGS. 4(a) to 4(e), silicon glass is deposited on a substrate 110 to form a lower cladding layer 120 and a core layer 130 through use of a flame hydrolysis deposition (FHD) technique or a chemical vapor deposition (CVD) technique [formation of a film on a lower plate; see FIG. 4(a)].

Next, photoresists 151, 152 constituting a lightwave pattern are formed on the deposited core layer 130 as a mask to be used in the next process of reactive ion etching (RIE) [see FIG. 4(b)]. A monolayer mask—which has a thickness of 5 μm and contains, e.g., novolak, as the principal ingredient—can be used for the photoresists.

Specifically, the device having such photoresists patterned thereon is processed by means of dry etching in a CF-based gas through use of the RIE process, whereby unwanted areas other than the masked areas are removed to thus form waveguide cores 131, 132 [processing of cores using the RIE process; see FIG. 4(c)]. Subsequently, the photoresists 151, 152 are removed by means of a technique, such as rinsing with an organic solvent or ashing [see FIG. 4(d)].

Further, silicon glass is deposited on the device in which the waveguide cores 131, 132 are formed through the RIE process and from which the photoresists 151, 152 are removed, thereby forming an upper cladding layer 140 [see FIG. 4(e)]. In order to achieve a thermal insulation effect or a light shielding effect when the dry etching is performed through the RIE process, a portion of the cladding layer 120 and a portion of the core layer 131, 132 are sometimes etched to the surface of the substrate 110 or to any point before reaching the surface of the substrate 110.

In addition to using the photoresists 151, 152 shown in FIG. 4, a conceivable mask to be used for dry etching at the time of formation of the waveguide cores includes a two-layer mask formed from a layer or a photoresist layer, the layer being formed from a high heat-resistant resin or metal, such as chromium, through processes shown in FIGS. 5(a) to 5(c).

Specifically, as shown in FIG. 5(a), a layer 160—which is formed from highly heat-resistant resin such as polyimide, or metal such as chromium or copper, and which is to become a lower layer mask—is formed on the overall core layer 130 of the substrate 110 having the lower cladding layer 120 and the core layer 130 formed therein. Next, photoresists 171, 172 constituting the waveguide core pattern are formed on the layer 160 by means of photolithography.

As shown in FIG. 5(b), the substrate is then subjected to etching through the RIE process, thereby forming lower masks 161, 162 constituting the waveguide core pattern. At this time, when the layer is formed from heat-resistant resin, an oxygen gas is used. When the layer 160 is formed from metal, etching is performed through use of a chlorine gas.

When the two-layer masks 151, 152, 161, and 162 are formed from the lower masks 161, 162 and the upper photoresist 170, the substrate is then etched through the RIE process through use of the CF-based gas, thereby forming the waveguide cores 131, 132 [see FIG. 5(c)]. Japanese Patent Laid-Open No. HEI 10-142438 describes an embodiment where copper is used as the lower mask shown in FIG. 5(b).

However, in the device manufacturing method shown in FIGS. 4(a) to 4(e), the photoresists used as the mask during the RIE process are thermally deformed by the heat developing in the substrate 110 during dry etching of silicon glass. Hence, there still arises a problem of occurrence of variations in the accuracy of formation of the waveguide core, which is caused as a result of deformation of the pattern serving as the mask.

Put another way, according to the technique shown in FIGS. 4(a) to 4(e), the width of the photoresists becomes reduced by the heat developing in the substrate 110 during the RIE processes, whereby an upper portion of the side surface of the core is sloped, thereby posing difficulty in accurately, stably forming the shape of the waveguide core.

Specifically, prevention of accuracy deterioration due to thermal deformation of the mask and lessening of variations in the width of the core are indispensable for a silicon glass etching process using etching such as the RIE process. Particularly, when an arrayed waveguide grating (AWG) is manufactured through the RIE process, difficulty may sometimes be encountered in providing an accurate difference in optical path lengths required to branch and merge the light beams spaced by a specified wavelength.

Against the backdrop of cost-reduction and high integration of the PLC being required with an aim of high-speed, large-capacity communication, a highly-integrated PLC device can be embodied through use of a structure (a high Δ structure) where a large difference exists between the specific refractive index of the core and the specific refractive index of the PLC device. However, this high Δ structure requires a reduction in the width of the core, and hence variations in processing of the light waveguide such as those mentioned previously must be reduced.

To this end, another conceivable way to improve the accuracy of formation of the waveguide core is use, as the mask for use in the RIE process, the two-layer mask where the photoresists 171, 172 are provided on the layers 161, 162 of high heat-resistant resin, such as polyimide, or metal.

However, this technique also requires another RIE process for patterning the lower layers 161, 162, which poses difficulty in curtailing costs. Moreover, since the number of processes is large, process errors arising the RIE process of the lower mask are accumulated to a greater extent as compared with the case of a monolayer mask, thereby increasing variations in processing.

Specifically, variations in the thickness of the lower masks 161, 162, variations in a rate at which the lower masks 161, 162 are etched, and variations in lateral etching of the mask layers are accumulated by means of RIE of the lower masks 161, 162.

The present invention has been conceived in view of such a problem and provides a device manufacturing method which renders etching accuracy high and curtails manufacturing costs when a device is manufactured in association with etching, such as RIE, where a device which is an object of etching evolves heat.

DISCLOSURE OF THE INVENTION

Accordingly, a device manufacturing method of the present invention is characterized by comprising: coating over a surface of a device a photosensitive resin containing a phenol-based resin as a main ingredient; transferring a desired pattern on the device surface coated with the photosensitive resin by means of exposing the device surface coated with the photosensitive resin to light with the desired pattern; developing the device having the pattern transferred thereon; and etching the device surface while the developed pattern of the photosensitive resin is taken as a mask pattern.

As a result, when a device is manufactured through the coating process, the transfer process, and the development process, a monolayer mask can be formed, as a mask to be formed in a stage preceding an etching step, from photosensitive resin which is less susceptible to thermal deformation than is a conventional photoresist and provides high patterning accuracy. Therefore, even when a monolayer mask is used as a mask in a case where there is performed etching involving evolution of heat from a device as in the case of reactive ion etching, thermal deformation of the mask, which would otherwise be caused by evolution of heat, can be prevented. Specifically, there is yielded an advantage of the ability to significantly enhance etching accuracy by means of preventing deterioration of etching accuracy, which would otherwise be caused by thermal deformation; i.e., suppression of a manufacturing error of a manufactured device.

Processes of reactive ion etching for etching a lower mask can be omitted as compared with the case of manufacturing a two-layer mask. There is also yielded an advantage of the ability to diminish manufacturing costs by reducing the number of operations, to reduce accumulated processes errors, and to significantly improve machining accuracy.

Particularly, when a planer lightwave circuit device is manufactured, an attempt can be made to improve performance and integration of the planer lightwave circuit device.

In this case, the etching processing can be preferably replaced with a reactive ion etching process.

More preferably, a device to be coated with photosensitive resin in the coating process is preferably given a structure where a cladding layer is formed on a substrate and a core layer is formed on the cladding layer. A portion or the entirety of the cladding layer may be etched in the etching process along with the core layer, whereby a desired layer geometry is formed.

A desired layer geometry may be formed in the device to be coated with photosensitive resin in the coating process, by means of forming a first cladding layer on a substrate, forming a core layer on the first cladding layer, forming a second cladding layer on the core layer, and etching a portion or entirety of the first cladding layer along with the second cladding layer and the core layer.

Moreover, an epoxy-based compound can be added to the photosensitive resin used for coating in the coating step, so that heat resistance of the photosensitive resin can be further enhanced. In this case, the proportion of the epoxy-based compound to be added to the photosensitive resin is preferably set to 1 percent to 5 percent.

Moreover, a melamine-based compound can be added to the photosensitive resin to be used for coating during the coating process, whereby the heat resistance of the photosensitive resin can be further enhanced. In this case, the proportion of the melamine-based compound to be added to the photosensitive resin is preferably set to 1 percent to 10 percent.

More preferably, the proportion of a phenol-based resin which is to be a principal ingredient of the photosensitive resin is preferably set to 25 percent to 35 percent.

BEST MODES FOR IMPLEMENTING THE INVENTION

Embodiments of the present invention will be described hereinbelow by reference to the drawings.

[A] Description of a first embodiment of the present invention

FIGS. 1(a) to 1(d) and FIGS. 2(a) to 2(d) are schematic diagrams for describing a device manufacturing method according to a first embodiment of the present invention. In the manufacturing method shown in FIGS. 1(a) to 1(d) and FIGS. 2(a) to 2(d), photosensitive resin—which is less susceptible to thermal deformation than is conventional photoresist and has high patterning accuracy—is used as a monolayer mask in connection with a mask formed in a stage preceding an etching step, thereby curtailing the number of processes in a manufacturing process and enhancing machining accuracy.

Figure 1A:
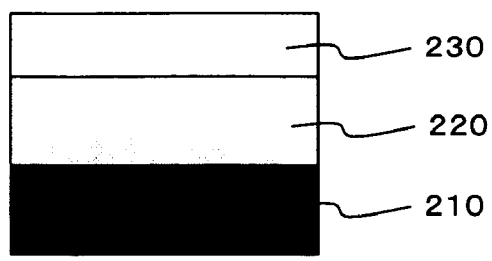
FIGS. 1(a) to 1(d) and FIGS. 2(a) to 2(d) are schematic diagrams for describing a device manufacturing method according to a first embodiment of the present invention.

As shown in FIG. 1(a), at the time of manufacture of a planer lightwave circuit device 200 using the method of the first embodiment, a core layer 230—which is formed from germanium-phosphor silicated glass (GPSG) film and which has a thickness of 4 micrometers (μm) to 7 micrometers or thereabouts—is deposited on a silicon substrate 210 having a thickness of about 1 mm and a diameter of 6 inch or thereabouts, along with a lower cladding layer 220 which is formed from boron-phosphor silicated glass (BPSG) film and has a thickness of about 20 micrometers, through use of an atmospheric-pressure CVD system (by an atmospheric-pressure CVD method).

Figure 1B:
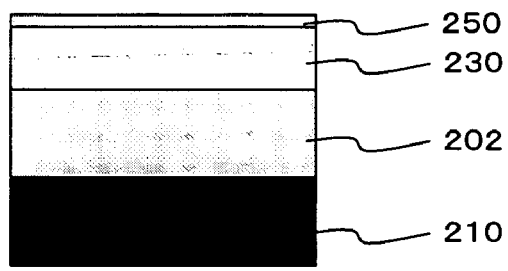

A photosensitive resin 250 containing phenol-based resin as the principal ingredient is applied over the surface of the device; i.e., the deposited core layer 230 [a coating step, see FIG. 1(b)]. The photosensitive resin 250 can be applied to a thickness of 3 to 4 micrometers or thereabouts through use of, e.g., a spin coater. Next, the substrate is subjected to a pre-baking process by means of a baking furnace or the like, in order to dry the thus-applied photosensitive resin 250. The photosensitive resin 250 takes phenol-based resin as the principal ingredient. The photosensitive resin is highly resistant to heat developing in etching based on RIE in a subsequent process, and geometrical changes in the photosensitive resin are smaller than those in a photoresist.

At this time, the photosensitive resin 250 applied over the core layer 230 is formed to have 1 to 10% of low-molecular-weight phenol-based resin, 1 to 5% of crosslinked (NBR-based) rubber, 0.1 to 2% of triazine-based sensitive material, 50 to 60% of ethyl lactate, and 25% to 35% of phenol-based resin.

Moreover, the heat resistance of the photosensitive resin can be enhanced by addition of a melamine-based compound or an epoxy-based compound as compared with a case where such a compound is not added to the photosensitive resin. The melamine-based compound is preferably set to a component ratio of 1 to 10%, and the epoxy-based compound is preferably set to a component ratio of 1 to 5%. Moreover, the larger the proportion of addition of the compound, the higher the heat resistance.

After application of the photosensitive resin 250 to the core layer 230, masks 251, 252 forming a waveguide pattern are subsequently formed by means of photolithography [see FIGS. 1(c), 1(d), and 2(a)].

Figure 1C:
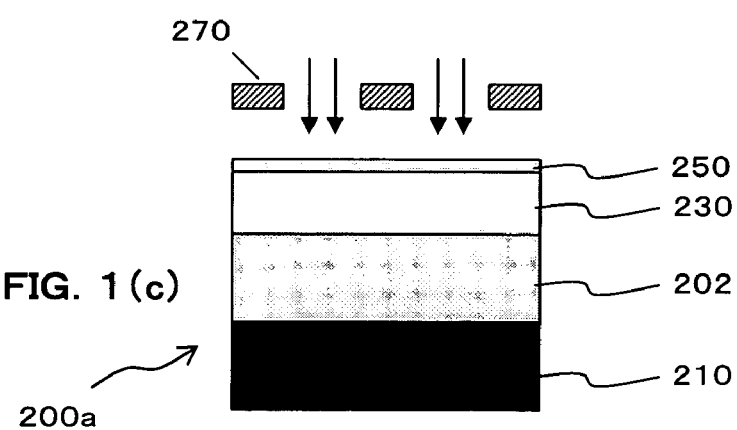
Figure 2A:
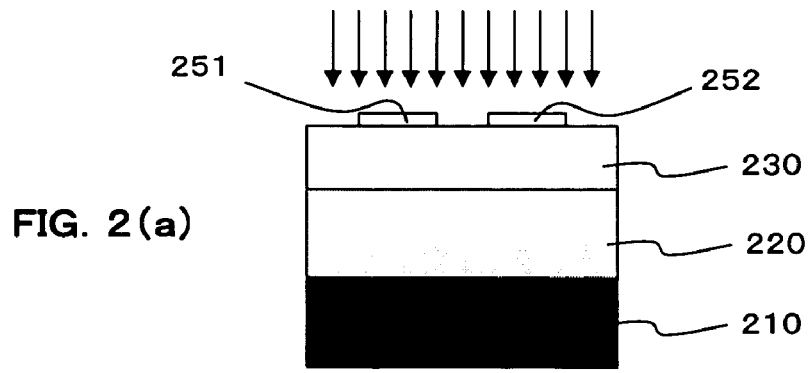

Specifically, in relation to a device 200a coated with the photosensitive resin 250, the device surface coated with the photosensitive resin 250 is exposed through use of a pattern of a waveguide to be formed in a transfer process, whereby the waveguide pattern is transferred on the coated surface of the photosensitive resin 250 [exposure to UV radiation; see FIG. 1(c)].

More specifically, in relation to the device 200a coated with the photosensitive resin 250, only areas which are desired to be left as a mask pattern are exposed to light (UV radiation) by use of an equimagnification projection exposure system or the like, thereby transferring a core pattern on the photosensitive resin 250. Put another way, only the areas which are desired to be left as a mask pattern (waveguide pattern) on the surface coated with the photosensitive resin 250 are exposed to UV radiation, thereby transferring the waveguide pattern on the surface coated with the photosensitive resin 250.

Subsequently, in relation to the exposed device, there may be a case where only the exposed areas of the exposed photosensitive resin 250 are crosslinked and where the substrate is baked by a hot plate or a baking furnace for transferring mask patterns 251, 252.

Figure 1D:
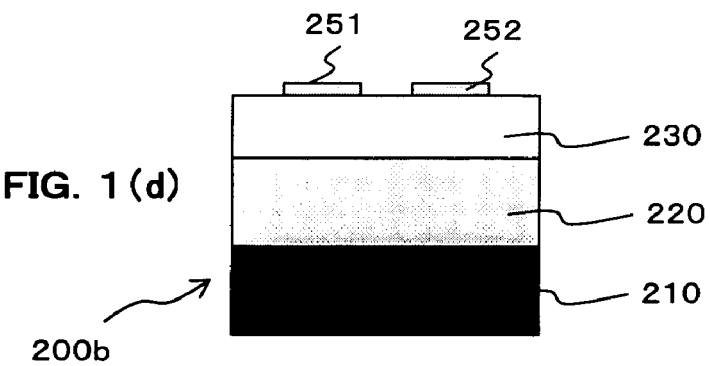

After the waveguide pattern has been transferred on the surface coated with the photosensitive resin 250 by means of previously-described exposure processing, a device 200b having such a waveguide pattern transferred thereon is developed in a development process [development; see FIG. 1(d)]. For instance, the pattern is developed in about 2.38 wt % of tetramethyl ammonium hydroxide (TMAH) solution, whereby the masks 251, 252 employed as a protective film during RIE in a subsequent stage are formed.

In order to fix the masks 251, 252, the entire surface of the developed device 200b having the masks 251, 252 formed thereon is exposed to UV radiation as post exposure. The substrate is further subjected to post-baking in the baking furnace [exposure of the entire surface to UV radiation; see FIG. 2(a)].

Figure 2B:
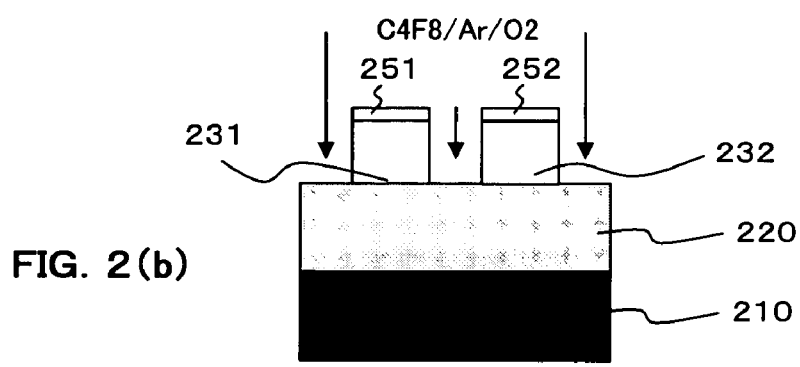
Figure 2C:
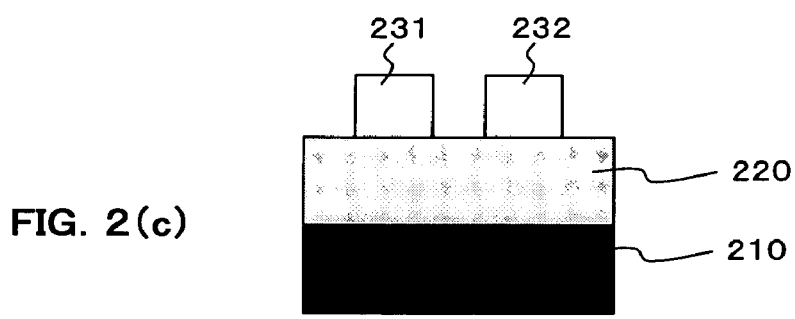
Figure 2D:
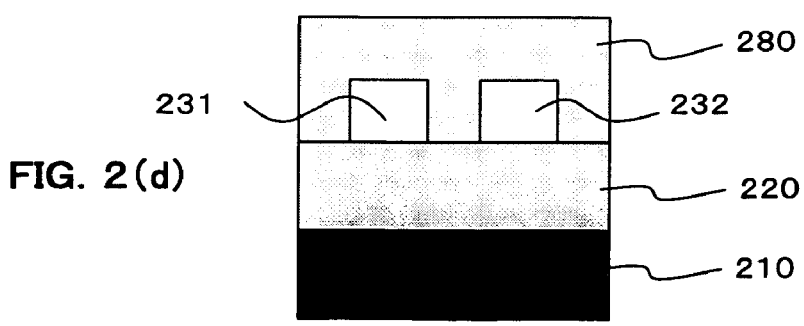

As mentioned previously, after the masks 251, 252 forming the waveguide pattern have been formed through photolithography, the device surface is then subjected to etching in the etching process while the pattern of the photosensitive resin 250 developed through development processing (the pattern of the masks 251, 252) is taken as a mask pattern [see FIG. 2(b) and FIG. 2(c)].

Specifically, dry etching is performed in a $C_4F_8/Ar/O_2$ mixed gas taken as a CF-based gas through use of the RIE system, thereby transferring the core pattern on the core layer [etching of the core layer by RIE, see FIG. 2(b)]. Of the core layer 230, areas where the masks 251, 252 are formed as upper layers remain as two waveguide cores 231, 232 having a desired layer geometry, and the remaining areas are etched away.

At this time, heat of 200 centigrade (° C.) to 300 centigrade or thereabout develops during the course of dry etching. However, as mentioned previously, the masks 251, 252 have higher heat resistance than does a conventional photoresist. Therefore, the amount of change in the width of the mask pattern can be reduced to, e.g., 0.1 micrometer or less.

Subsequently, the device having undergone RIE is subjected to ashing in an oxygen plasma ashing system, thereby removing the masks 251, 252 serving as the photosensitive resin [removal of photosensitive resin; see FIG. 2(c)]. Moreover, the device from which the masks 251, 252 have been removed is again subjected to the atmospheric-pressure CVD system, thereby depositing a BPSG film having a thickness of about 20 micrometers as an upper cladding layer 280.

Figure 5A:
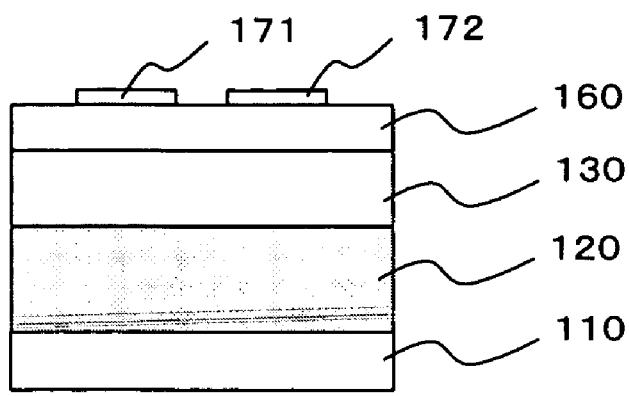
Figure 5B:
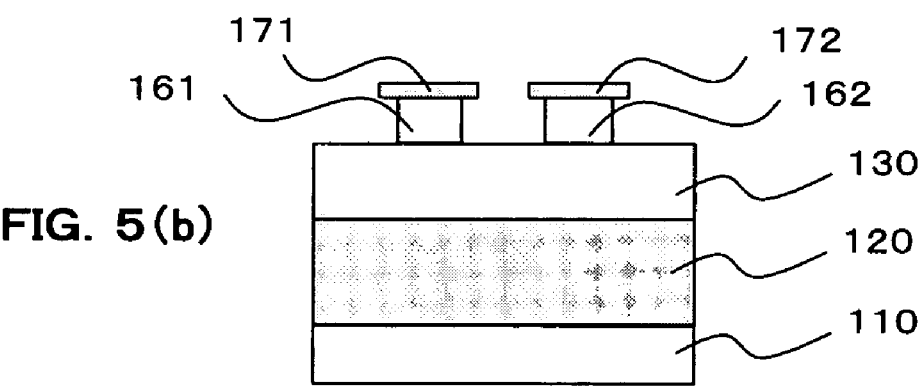
Figure 5C:
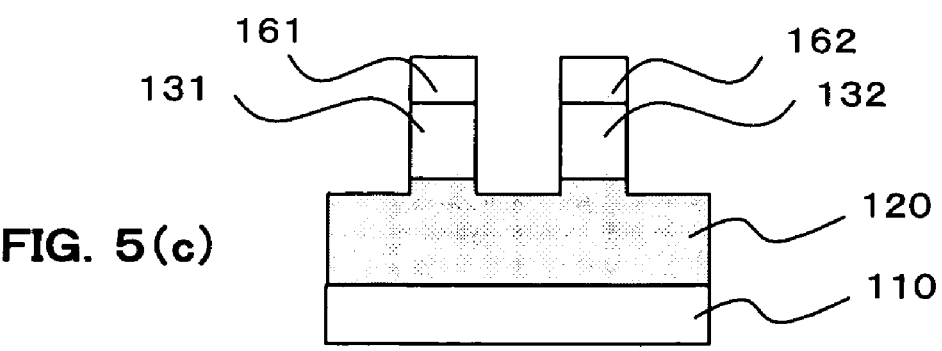

Variations in the light waveguide core are defined as a difference between the maximum actually-measured core width and the minimum actually-measured core width in connection with the waveguide core designed with a single width within a single substrate. Variations in the width of the light waveguide core constituting the planer light waveguide circuit device 200 manufactured in the previously-described manner can be reduced to, e.g., 0.19 micrometers. In contrast, in the case of the light waveguide device manufactured by the technique shown in FIG. 5, variations assume a value of, e.g., 0.66 micrometers. In short, when compared with the case where the device is manufactured by the manufacturing method shown in FIG. 5, manufacturing errors in the core width can be significantly improved by manufacturing the device according to the manufacturing method of the first embodiment.

As mentioned above, according to the device manufacturing method of the first embodiment of the present invention, when the planer light waveguide circuit device 200 taken as the light waveguide device is manufactured through the coating process, the transfer process, and the development process, a monolayer mask can be formed, as the mask to be formed in a stage preceding the etching process, from photosensitive resin which is less susceptible to thermal deformation than is a conventional photoresist and has high patterning accuracy. Accordingly, even when a monolayer mask is used as a mask in a case where there is performed etching involving evolution of heat from a device as in the case of RIE, thermal deformation of the mask, which would otherwise be caused by evolution of heat, can be prevented. Specifically, there is yielded an advantage of the ability to significantly enhance etching accuracy by means of preventing deterioration of etching accuracy, which would otherwise be caused by thermal deformation; i.e., suppression of a manufacturing error of a manufactured device.

Processes of RIE for etching a lower mask can be omitted when compared with the case of manufacture of a two-layer mask. There is also yielded an advantage of the ability to diminish manufacturing costs by reducing the number of operations, to reduce accumulated processes errors, and to significantly improve machining accuracy.

Particularly, when the planer lightwave circuit device 200 such as that described in connection with the first embodiment is manufactured, an attempt can be made to improve performance and integration of the planer lightwave circuit device by enhancing the accuracy of core width to significantly reduce manufacturing errors.

The ethyl lactate forming the photosensitive resin 250 is used for controlling the viscosity or the like of a resist taken as a solvent. Specifically, the viscosity of the resist is increased by reducing the component ratio of ethyl lactate, and the photosensitive resin 250 can be applied in the form of a thick layer. Meanwhile, the viscosity of the resist is reduced by increasing the component ratio of ethyl lactate, so that the photosensitive resin 250 can be applied in the form of a thin layer.

Particularly, even when the lower cladding layer 220 is etched comparatively deep along with the core layer 230 by means of RIE as in the case of manufacture of a device to be etched away, the component ratio of ethyl lactate is reduced, thereby rendering thick the layers which are to become the masks 251, 252. Conversely, when a device having a comparatively-thin layer to be removed through RIE is manufactured, the component ratio of ethyl lactate is increased, thereby rendering thin the layers which are to become the masks 251, 252.

[B] Description of a Second Embodiment of the Present Invention

FIGS. 3(a) to 3(d) are schematic diagrams for describing a device manufacturing method according to a second embodiment of the present invention. Even in the manufacturing method shown in FIGS. 3(a) to 3(d), as in the case of the aforementioned first embodiment, photosensitive resin—which is less susceptible to thermal deformation than is conventional photoresist and has high patterning accuracy—is used as a monolayer mask in connection with a mask formed in a stage preceding an etching step, thereby manufacturing a device.

A planer lightwave circuit device 300 of the second embodiment is manufactured by means of subjecting a light waveguide substrate 300a formed through the same processes as those employed in the first embodiment to processes; that is, a coating process, a transfer process, a development process, and an etching process.

Upper and lower cladding layers 320, 340 enwrapping a waveguide core 331 are formed on the light waveguide substrate 300a along with the waveguide core 331. A heater member 350 for heating purpose is stacked on the waveguide core 331 by way of the upper cladding layer 340. This lightwave substrate 300a can also be manufactured by adding a process for stacking the heater member subsequent to the processes substantially identical with those described in connection with the first embodiment.

Specifically, at the time of manufacture of the light waveguide substrate 300a, photosensitive resin containing the phenol-based resin as the principal ingredient is applied over the core layer 330 through the coating process in connection with the substrate 310 on which the lower cladding layer 320 and the core layer 330 are formed, by means of the atmospheric-pressure CVD process or the like. In the transfer process, the substrate is then exposed with a pattern to be used for forming a single waveguide core 331. The device on which the pattern is transferred through the development process is subjected to development. The device surface is subjected to RIE while taking as a mask pattern, a pattern of photosensitive resin developed through development processing. Moreover, the upper cladding layer 340 is formed through the atmospheric-pressure CVD process, and the heater member 350 is stacked on the upper cladding layer 340.

The planer lightwave circuit device 300 of the second embodiment is manufactured through processes such as those shown in, e.g., FIGS. 3(a) to 3(d).

Figure 3A:
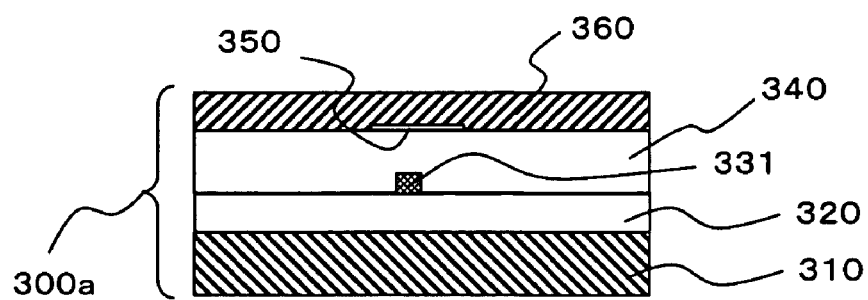
FIGS. 3(a) to 3(d) are schematic diagrams for describing a device manufacturing method according to a second embodiment of the present invention.
Figure 3B:
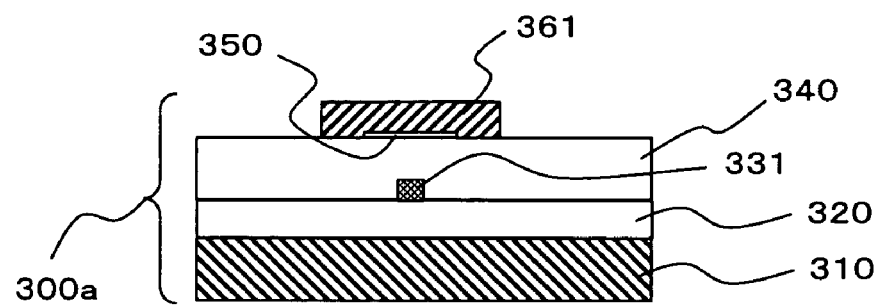

In the coating process, photosensitive resin 360 containing phenol-based resin as the principal ingredient is applied over the device surface; i.e., the upper cladding layer 340 and the heater member 350 which are deposited on the waveguide substrate 300a [coating of photosensitive resin; see FIG. 3(a)].

The photosensitive resin 360 can be applied to a thickness of about 20 μm by means of, e.g., a spin coater. The photosensitive resin 360 also contains the phenol-based resin as the principal ingredient. Therefore, the photosensitive resin has high heat resistance to the heat stemming from etching during the subsequent RIE process and is less susceptible to a geometrical change than is photoresist.

As in the case of the first embodiment, the photosensitive resin 360 of the second embodiment is also formed from, the low-molecular-weight phenol-based resin, the crosslinked rubber (NBR-based), the triazine-based sensitive material, ethyl lactate, and the phenol-based resin characterizing the present invention. This photosensitive resin 360 is formed in a relatively smaller proportion of ethyl lactate than in the first embodiment. As a result, the viscosity of the photosensitive resin is increased, so that the photosensitive resin can be applied more thickly than in the case of the photosensitive resin 250 of the first embodiment.

Moreover, as in the case of the first embodiment, the heat resistance of the photosensitive resin 360 can be enhanced by addition of a melamine-based compound or an epoxy-based compound to the photosensitive resin 360 as compared with a case where no compound is added to the photosensitive resin. A preferred component ratio of the melamine-based compound to be added is set to 1 to 10%, and a preferred component ratio of the epoxy-compound to be added is set to 1 to 5%. Alternatively, the heat resistance can be enhanced further by increasing the ratio of a compound to be added.

The photosensitive resin 360 is applied over the upper cladding layer 340 and the heater member 350 in the manner mentioned previously. Subsequently, an etching mask 361 is formed to acquire the geometry of the planer lightwave circuit device 300 of the second embodiment, by means of photolithography [patterning of photosensitive resin, see FIG. 3(b)].

Specifically, in the transfer process, the device surface of the waveguide substrate 300a coated with the photosensitive resin 360 is exposed through use of a pattern of the planer lightwave circuit device 300 to be formed, whereby the pattern is transferred on the surface coated with the photosensitive resin 360.

More specifically, as in the case of the first embodiment, the waveguide substrate 300a coated with the photosensitive resin 360 is exposed through use of the equimagnification projection exposure system or the like. Namely, only the areas desired to be left as a mask pattern are exposed to light (UV radiation) through use of an unillustrated glass mask, thereby transferring a pattern on the photosensitive resin 360.

The areas of the waveguide substrate 300a which are desired to be left as a mask pattern to be used for RIE in a subsequent stage are the upper and lower cladding layers 320, 340 having widths required to wrap the waveguide core 331 along with, at least, the waveguide core 331 and the heater member 350. In other words, the upper and lower claddings 320, 340 provided on the respective sides of the lightwave substrate 300a in FIG. 3(a) are etched by means of RIE in a subsequent stage.

In the transfer process, there may be a case where only the exposed areas of the exposed photosensitive resin 360 are crosslinked and where the substrate is baked on a hot plate or a bake surface for transferring a mask pattern.

The mask pattern is transferred to the surface coated with the photosensitive resin 360 through the foregoing exposure processing, and, in the development process, the device 300b having the mask pattern transferred thereon is subjected to development. For instance, as in the case of the first embodiment, a pattern is developed in about 2.38 wt % of tetramethyl ammonium hydroxide (TMAH) solution. Thereby, the mask 361 employed as a protective film during RIE in a subsequent stage is formed [patterning of photosensitive resin, FIG. 3(b)].

Figure 3C:
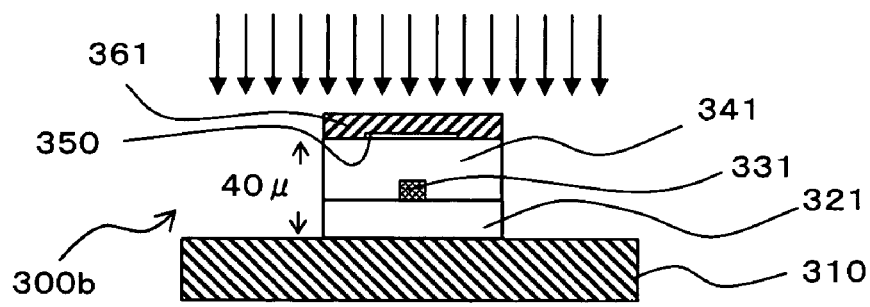

As mentioned previously, the device surface having the mask 361 formed thereon is etched in the etching process, whereby a layer geometry, such as that shown in FIG. 3(c), is obtained. Specifically, the substrate is subjected to dry etching until both side areas of the silicon substrate 310 constituting the light waveguide substrate 300a are exposed, thereby removing the upper cladding layer 340 and the lower cladding layer 320.

Specifically, dry etching is performed in a $C_4F_8/Ar/O_2$ mixed gas taken as a CF-based gas, through use of the RIE system, thereby etching the upper and lower cladding layers 320, 340 exclusive of the mask pattern 361 [etching of claddings]. In the drawing, the silicon substrate 310, the waveguide core 331, the heater member 350, and the upper and lower cladding layers 320, 340 enclosing the heater member 350 are protected from RIE by means of the mask 361. The remaining areas are etched away.

At this time, heat of 200 centigrade to 300 centigrade or thereabouts develops during the course of dry etching. However, as mentioned previously, the mask 361 has greater heat resistance than does a conventional photoresist. Therefore, the amount of change in the width of the mask pattern can be reduced.

Figure 3D:
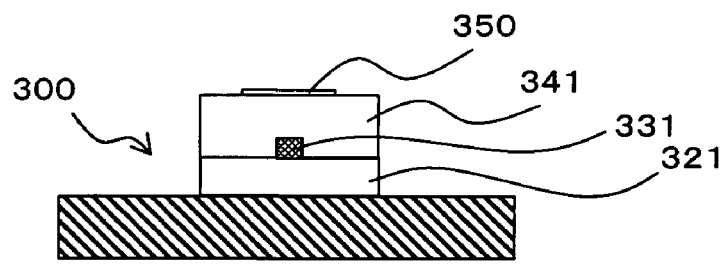
Figure 4A:
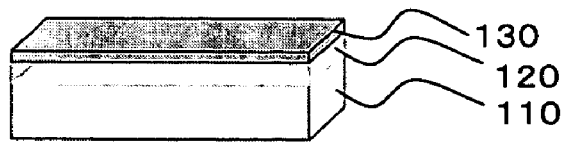
FIGS. 4(a) to 4(e) and FIGS. 5(a) to 5(c) are views showing processes for manufacturing a quartz-based planer lightwave circuit device 100 taken as a conventionally-used PLC-type integrated element.
Figure 4B:
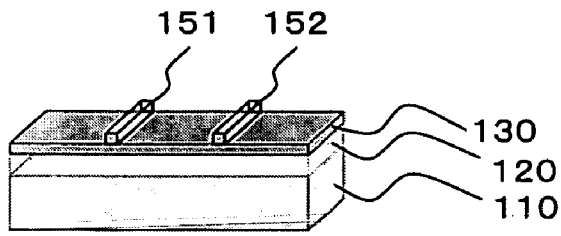
Figure 4C:
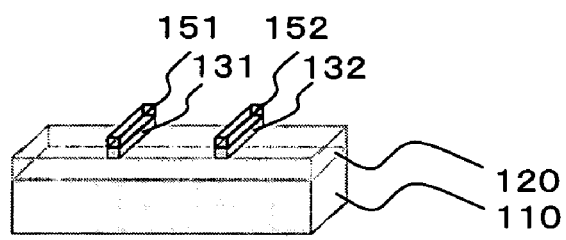
Figure 4D:
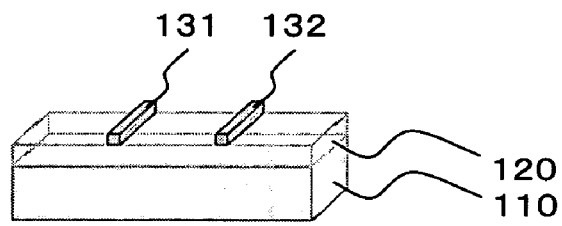
Figure 4E:
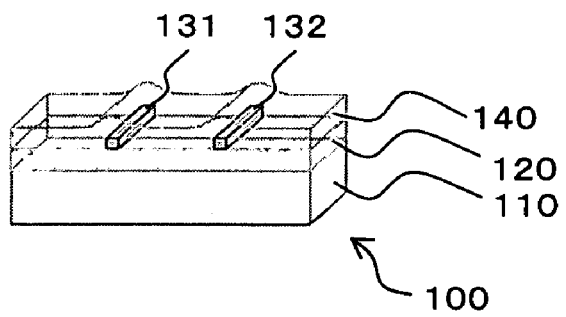

Subsequently, the device having undergone RIE is subjected to ashing in the oxygen plasma ashing system, thereby removing the mask 361 serving as the photosensitive resin [removal of photosensitive resin, see FIG. 3(d)].

The thus-manufactured planer lightwave circuit device 300 can be embodied as the planer lightwave circuit device 300 having an optical switching function for switching the direction of light to be transmitted and a light attenuation function for attenuating the light to be transmitted, by means of heating the heater member 350 formed in an upper portion of the waveguide core 331 and changing the refractive index of the heated portion.

In the planer lightwave circuit device 300, both sides of the upper and lower cladding layers 320, 340 shown in FIG. 3(a) except the areas surrounding the waveguide core 331 are etched by means of RIE, thereby enhancing heat transfer efficiency of the heater member 350. Put another way, power consumption of the heater for changing the refractive index of the waveguide core 331 can be diminished by means of removing the cladding layers 320, 340 located immediately close to the waveguide core 331.

The widths of the remaining portions of the cladding layers (the cladding layers protected by the mask 361) 321, 341 are reduced within the range where guided light is not subjected to loss, thereby enabling manufacture of a device which realizes a low loss and low power consumption. According to the present invention, deformation of the mask 361 can be prevented by means of the heat developing from RIE. Hence, a low-loss, low-power-consumption planar lightwave circuit device can be embodied with extremely high precision.

As mentioned above, under the device manufacturing method according to the second embodiment of the present invention, when the planar lightwave circuit device 300 taken as the light waveguide device is manufactured through the coating process, the transfer process, and the development process, a mask to be formed in a stage before the etching process can be formed, as a monolayer mask, from photosensitive resin which is less susceptible to thermal deformation than is conventional photoresist and which has high patterning accuracy. Hence, there is yielded the same advantage as that yielded in the first embodiment.

In the aforementioned second embodiment, the upper and lower cladding layers 320, 340 are etched in the etching process. However, the present invention is not limited to this embodiment. Portions or the entirety of the cladding layers 320, 340 and the core layer may be etched.

In the second embodiment, the portions of the upper and lower cladding layers 320, 340 located on the respective sides of the waveguide core 331 having the heater member 350 are etched. However, the present invention is not limited to this embodiment. Needless to say, even when other portions are etched for shielding light or releasing stress, the present invention is effected.

[C] Others

Regardless of the foregoing embodiments, the present invention can be practiced while being modified in various manners within the scope of the present invention.

For instance, it goes without saying that the device manufacturing method of the present invention can be applied to at least a device, other than the light waveguide device, which is manufactured through an etching process, such as RIE, where the device itself evolves heat.

Moreover, according to the device manufacturing method of the present invention, etching to be performed in the etching process is not limited to RIE. Needless to say, the present invention can be applied to even the case where there is performed at least etching presumed to involve deformation of the shape of the mask, which would otherwise be caused by evolution of heat by the device.

A person who is versed in the art can manufacture the device on the basis of disclosure of the respective embodiments of the invention.

INDUSTRIAL APPLICABILITY

As has been described, the device manufacturing method of the present invention is useful for manufacturing a device in association with at least etching operation presumed to involve deformation of the shape of a mask, which is caused by evolution of heat of the device. Particularly, the method is suitable for manufacturing a planar lightwave circuit device in the field of optical communication.

The invention claimed is:

1. A device manufacturing method comprising:
preparing a photosensitive resin which contains a phenol-based resin as a main ingredient and a heat resistance enhancing compound added;
coating over a surface of a device with said photosensitive resin;
transferring a desired pattern on the device surface coated with said photosensitive resin by means of exposing said device surface coated with said photosensitive resin to light with said desired pattern;

developing treatment said device having said pattern transferred thereon; and etching said device surface while said developed pattern of said photosensitive resin is taken as a mask pattern, wherein said photosensitive resin further contains ethyl lactate arranging a thickness of said developed pattern of said photosensitive resin.

2. The device manufacturing method according to claim 1 wherein said etching is reactive ion etching.

3. The device manufacturing method according to claim 1, wherein said device to be coated with a photosensitive resin in said coating is formed by forming a cladding layer on a substrate and a core layer on said cladding layer, and a portion or entirety of said cladding layer is etched along with said core layer in said etching, to thus form a desired layer geometry.

4. The device manufacturing method according to claim 1, wherein said device to be coated with a photosensitive resin in said coating is formed by forming a first cladding layer on a substrate, a core layer on said first cladding layer, a second cladding layer on said core layer, and portions or entirety of said first and second cladding layers and said core layer are etched in said etching, to thus form a desired layer geometry.

5. The device manufacturing method according to claim 1, wherein an epoxy-based compound is added to said photosensitive resin applied in said coating.

6. The device manufacturing method according to claim 5, wherein a content of said epoxy-based compound to be added to said photosensitive resin is set to 1 percent to 5 percent.

7. The device manufacturing method according to claim 1, wherein a melamine-based compound is added to said photosensitive resin applied in said coating.

8. The device manufacturing method according to claim 7, wherein a content of said melamine-based compound to be added to said photosensitive resin is set to 1 percent to 10 percent.

9. The device manufacturing method according to claim 1, wherein a content of said phenol-based resin serving as the main ingredient of said photosensitive resin is set to approximately 25 percent to approximately 35 percent.

* * * * *